(Model.) 2 Sheets—Sheet 1.
C. A. HUSSEY.
Dynamo Electric Machine.
No. 243,264. Patented June 21, 1881.
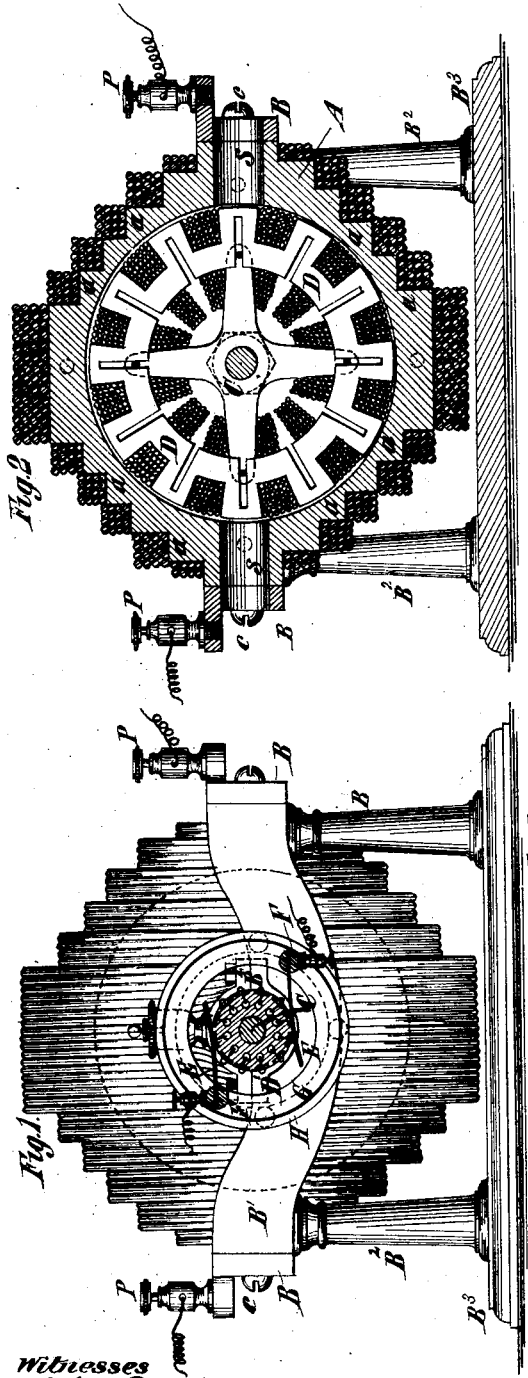
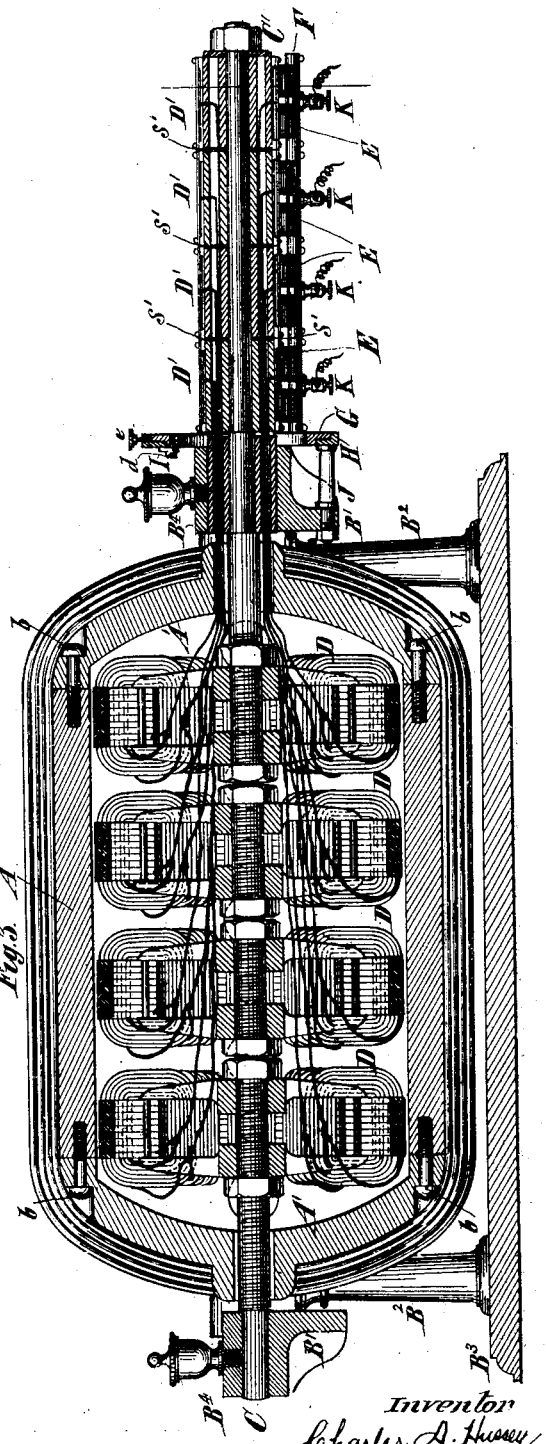
Witnesses
John Becker
Thomas E. Birch.
Inventor
Charles A. Hussey
by his attys.
Brown & Thran

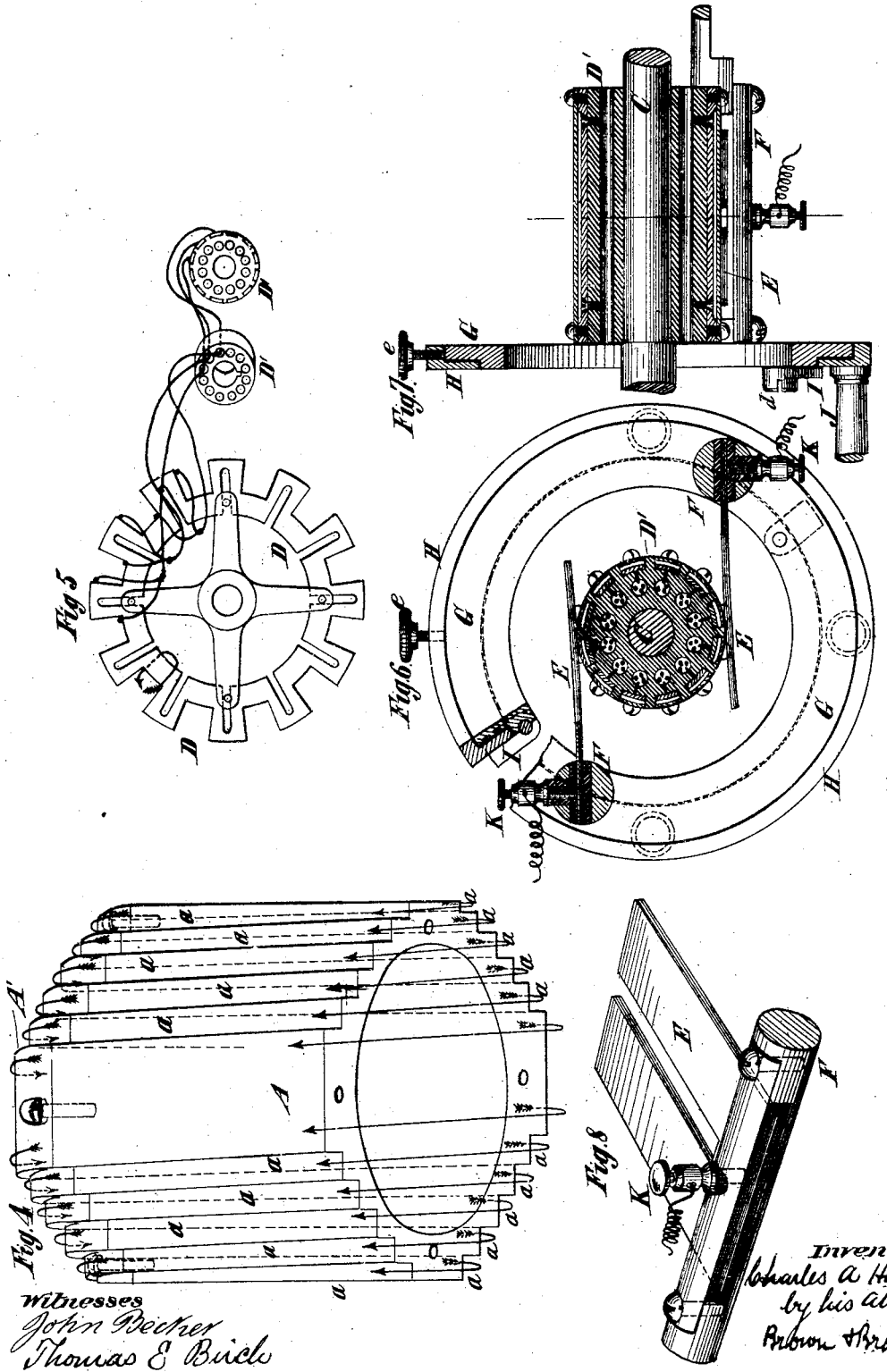

UNITED STATES PATENT OFFICE.

CHARLES A. HUSSEY, OF NEW YORK, N. Y., ASSIGNOR, BY DIRECT AND MESNE ASSIGNMENTS, TO THE HUSSEY ELECTRIC COMPANY, OF SAME PLACE.

DYNAMO-ELECTRIC MACHINE.

SPECIFICATION forming part of Letters Patent No. 243,264, dated June 21, 1881.

Application filed October 23, 1880. (Model.)

*To all whom it may concern:*

Be it known that I, CHARLES A. HUSSEY, of the city of New York, in the county and State of New York, have invented certain new and useful Improvements in Dynamo and Magneto Electric Machines, of which the following is a specification.

An important object of my improvements is to increase the effectiveness of dynamo and magneto electric machines.

To this end my improvements consist in an electro-magnet composed of a core of internally circular, cylindric, or analogous form, and wire wound over its exterior, without passing through its interior, from end to end, and inclosing it, save at certain places designed to form poles or consequent points.

They also consist in an electro-magnet composed of a core of internally circular, cylindric, or analogous form, provided, save at certain places designed to form consequent points, with external ridges, and wire wound over the exterior of the core on said ridges, but not through the interior of the core.

They also consist in an electro-magnet composed of a core of internally circular, cylindric, or analogous form, provided, save at certain places designed to form consequent points, with external ridges disposed spirally or angularly, and wire wound over the exterior of the core on said ridges, but not through the interior of the core. An armature wound with wire and rotated within such an electro-magnet, as above described, obviously travels before poles or consequent points the whole length of the magnet and through the entire field of force. Hence it effects the generation of electric currents throughout its entire rotation. Such electro-magnet may be perforated to allow of the circulation of air for cooling.

In the accompanying drawings, Figure 1 is an end view of a machine embodying my improvements. Fig. 2 is a transverse section of the same. Fig. 3 is a central longitudinal section of the same. Fig. 4 is a perspective view of the electro-magnet core thereof. Fig. 5 is an end view of the armature, including a diagrammatic view of the commutators and connecting or leading wires. Fig. 6 is an end view of one of the commutators, its brushes, and means for adjusting them, with certain parts in section. Fig. 7 is a longitudinal section of one of the commutators and means for adjusting its brushes; and Fig. 8 is a perspective view of one of the commutator-brushes.

Similar letters of reference designate corresponding parts in all the figures.

A designates the core of an electro-magnet, which is internally circular or cylindrical, and externally, except where consequent points are designed to be formed, is provided with longitudinal ridges or grooves $a$. These longitudinal ridges or grooves are intended to have wire wound longitudinally on or in them, and to enable the wire to be wound spirally over them they are preferably disposed spirally or angularly, as shown more particularly in Fig. 4. Other means for retaining the wire on the exterior of the magnet-core may be employed. The example of magnet-core here shown is designed to have but two consequent points arranged diametrically opposite each other, though my invention is not restricted to a magnet having that number of consequent points. The wire may be wound continuously or in sections on different sides of the consequent points, but runs in the same direction in either case.

The core A is shown as provided at the ends with caps A', (shown as slightly convex,) and secured to it by screws $b$. They and the core are to be made of cast-iron or other suitable material. The wire is wound only over the exterior, as shown particularly in Figs. 1 and 3, and does not extend through the interior at all, wherefore the magnet has an inner surface which is continuous or unobstructed throughout its length. The magnet-core may be provided with transverse holes S (see Fig. 2) to allow of a circulation of air, whereby it may be kept cool. As shown, this magnet is supported by a frame, B B', consisting of side bars, B, and cross-bars B', the magnet being secured to the frame by screws $c$, passing through the side bars, B, and the consequent points of the magnets. The frame is erected on posts or pillars $B^2$, (shown as mounted on a base-piece, $B^3$,) and its cross-bars B' are provided with journal-boxes $B^4$, wherein is supported, concentric with the interior of the magnet, a shaft, C, upon which a series of armatures, D, are mounted. These armatures D are entirely electrically separate from and independent of each other. Each consists of a hollow core of wrought-iron or other suitable material provided with radial projections, between which, over the exterior of the intervening groove or recess, and back through the inside of the core, wire is wound longitudinally. The core has a central opening lengthwise through it, and other openings extending lengthwise through its radial projections for the passage of air, whereby the armature will be kept cool.

I have shown the cores of the armatures as composed of a number of narrow plates secured together side by side lengthwise of the armature. The means employed to secure them together consist, in this example of my invention, of spiders or end pieces, of brass or other suitable material, mounted on the shaft and bearing against the outer sides of the radial projections of the end plates in each armature. They may be fastened by bolts or screws passing through the armature-plates, and may be secured to the shaft by one being screwed thereon and the other being retained in place by a nut screwed on the shaft adjacent to it, or by both being screwed thereon or retained by nuts. The two spiders or end pieces are in this way made to clamp the plates composing the armature-core together and secure them to the shaft.

The ends of the wires which are wound on the armature are looped together, as shown particularly in Fig. 5, and connected to leading-wires which extend along grooves in the shaft C, or otherwise, to plates of commutators D', supported on the shaft C, one commutator being supplied for each armature, and each commutator having a number of plates corresponding to the number of grooves or recesses wherein wire is wound in the armature with which it is connected. The commutators are secured on the shaft C by being clamped in position through the agency of a nut, C', screwed on the end of the shaft, and they may be removed at pleasure. Where the wire wound around the electro-magnet is charged with electricity from a source outside the machine, and where a direct or continuous current in one direction is not especially needed, commutators are unnecessary. The wire on the magnet may be connected with the source of electricity whereby it is to be charged through the binding-posts P. The commutators may be insulated from each other by washers S', of hard rubber or other suitable material. Each armature, in conjunction with the magnet, generates a separate and independent current; hence, if the armatures are graduated for the desired potentials, there will be no need of dividing up the electricity generated by the machine. The single magnet is very effective, inasmuch as it acts and reacts on the separate armatures, and it is not detrimental to the results severally attained from the various armatures, because one or more may at times be inoperative, for then the inoperative armatures will serve as keepers to the magnet and prevent any undue augmentation of the potential or effect of the other armatures.

The commutator-brushes may be of ordinary form, consisting of thin metallic plates E, secured at opposite sides of the commutators to bars F, extending parallel with the shaft C, but severally insulated from said bars by hard rubber or other suitable material. These bars F are shown as connected to an adjustable ring, G, which is fitted to and supported by a stationary ring, H, being retained in contact with said stationary ring by bearers I, lapping over the opposite side of the said stationary ring, and secured to the adjustable ring by screws $d$. The adjustable ring may be retained in any position into which it may be adjusted by set-screws $e$, passing radially through the stationary ring and impinging against the periphery of the adjustable ring. The stationary ring is supported by bars J, extending to it from the adjacent cross-bar B' of the frame B B'. By this mode of supporting the commutator-brushes I provide for adjusting them together at pleasure and securing them in similar positions relatively to their commutators. Binding-posts K are connected to the commutator-brushers for the attachment of circuit-wires for conveying away the electric currents.

The shaft C may be driven through a pulley or crank mounted thereon, or in any other desirable manner.

The armatures, it will be seen, rotate before the consequent points, before the whole length of the magnet, in close proximity to its core, and through the entire field of force, wherefore very powerful currents of electricity are generated.

What I claim as my invention, and desire to secure by Letters Patent, is—

1. An electro-magnet composed of a core of internally circular, cylindric, or analogous form, and wire wound over its exterior, without passing through its interior, from end to end, and inclosing it, save at certain places designed to form poles or consequent points, substantially as set forth.

2. An electro-magnet composed of a core of internally circular, cylindric, or analogous form, provided, save at certain places designed to form consequent points, with external ridges and wire wound over the exterior of the core on said ridges, but not through the interior of the core, substantially as set forth.

3. An electro-magnet composed of a core of internally circular, cylindric, or analogous form, provided, save at certain places designed to form consequent points, with external ridges disposed spirally or angularly, and wire wound over the exterior of the core on said ridges, but not through the interior of the core, substantially as set forth.

CHARLES A. HUSSEY.

Witnesses:
 A. C. WEBB,
 EDWIN H. BROWN.